United States Patent
Rodriguez-Llorente

(10) Patent No.: US 6,895,142 B2
(45) Date of Patent: May 17, 2005

(54) BRANCHING UNIT

(75) Inventor: Fernando Rodriguez-Llorente, London (GB)

(73) Assignee: Alcatel, Paris (FR)

( * ) Notice: Subject to any disclaimer, the term of this patent is extended or adjusted under 35 U.S.C. 154(b) by 240 days.

(21) Appl. No.: 10/281,322

(22) Filed: Oct. 28, 2002

(65) Prior Publication Data

US 2003/0091273 A1 May 15, 2003

(30) Foreign Application Priority Data

Oct. 31, 2001 (GB) .................................. 0126168

(51) Int. Cl.⁷ .................................................. G02B 6/28
(52) U.S. Cl. ........................................................ 385/24
(58) Field of Search ........................... 385/24, 42, 16, 385/2, 45; 398/82–88, 104, 105, 14, 79; 359/618, 634

(56) References Cited

U.S. PATENT DOCUMENTS

| 5,655,036 | A | * | 8/1997 | Webb ............................ 385/15 |
| 5,953,141 | A | | 9/1999 | Liu et al. |
| 6,486,989 | B2 | * | 11/2002 | Shinoda ........................ 398/79 |
| 6,724,539 | B2 | * | 4/2004 | Kenmochi et al. .......... 359/634 |
| 6,731,879 | B1 | * | 5/2004 | Frisch et al. ................ 398/104 |
| 6,760,521 | B2 | * | 7/2004 | Watanabe ..................... 385/50 |
| 6,765,775 | B2 | * | 7/2004 | Pirovano .................... 361/93.1 |
| 6,781,754 | B2 | * | 8/2004 | Zhao ........................... 359/497 |
| 2001/0015836 | A1 | | 8/2001 | Kim et al. |
| 2002/0149818 | A1 | * | 10/2002 | Tomofuji et al. ........... 359/124 |

FOREIGN PATENT DOCUMENTS

| GB | 2315380 A | 1/1998 |
| GB | 2348557 A | 10/2000 |
| WO | WO 0048348 | 8/2000 |

* cited by examiner

Primary Examiner—Thien M Le
Assistant Examiner—Edwyn Labaze
(74) Attorney, Agent, or Firm—Sughrue Mion, PLLC

(57) ABSTRACT

An optical branching unit is formed of a plurality of interconnected optical interleavers for separating input optical signals into separate components for output on separate branches and for combining separated component optical signals with other input optical signals for output on common branches.

18 Claims, 3 Drawing Sheets

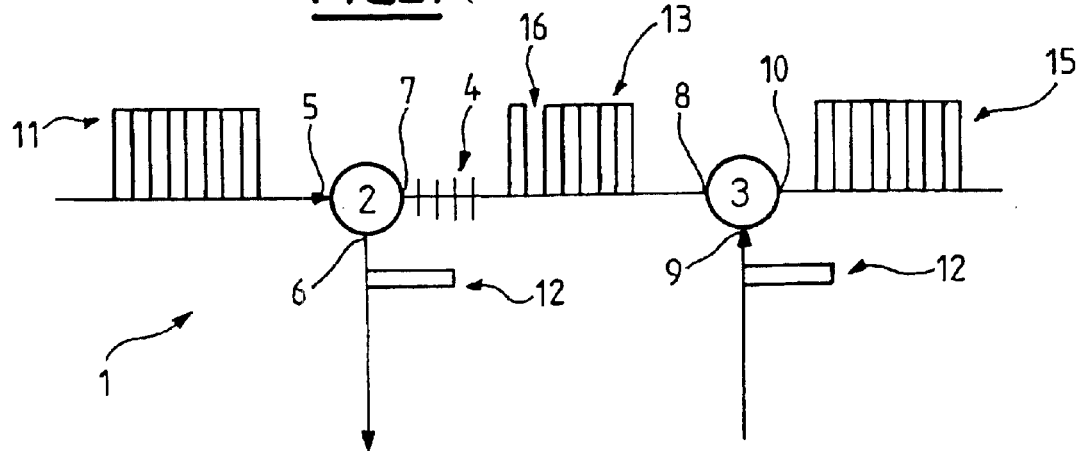
FIG_1 (PRIOR ART)
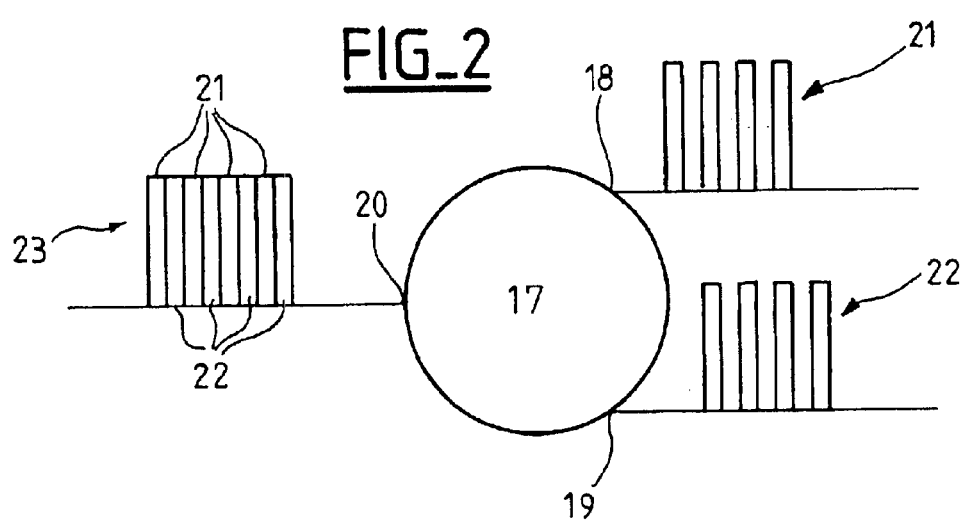
FIG_2
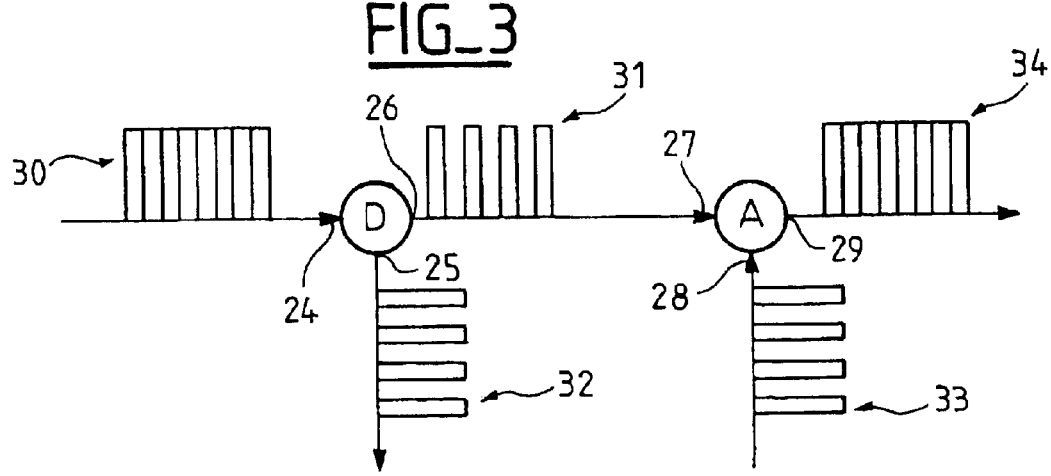
FIG_3

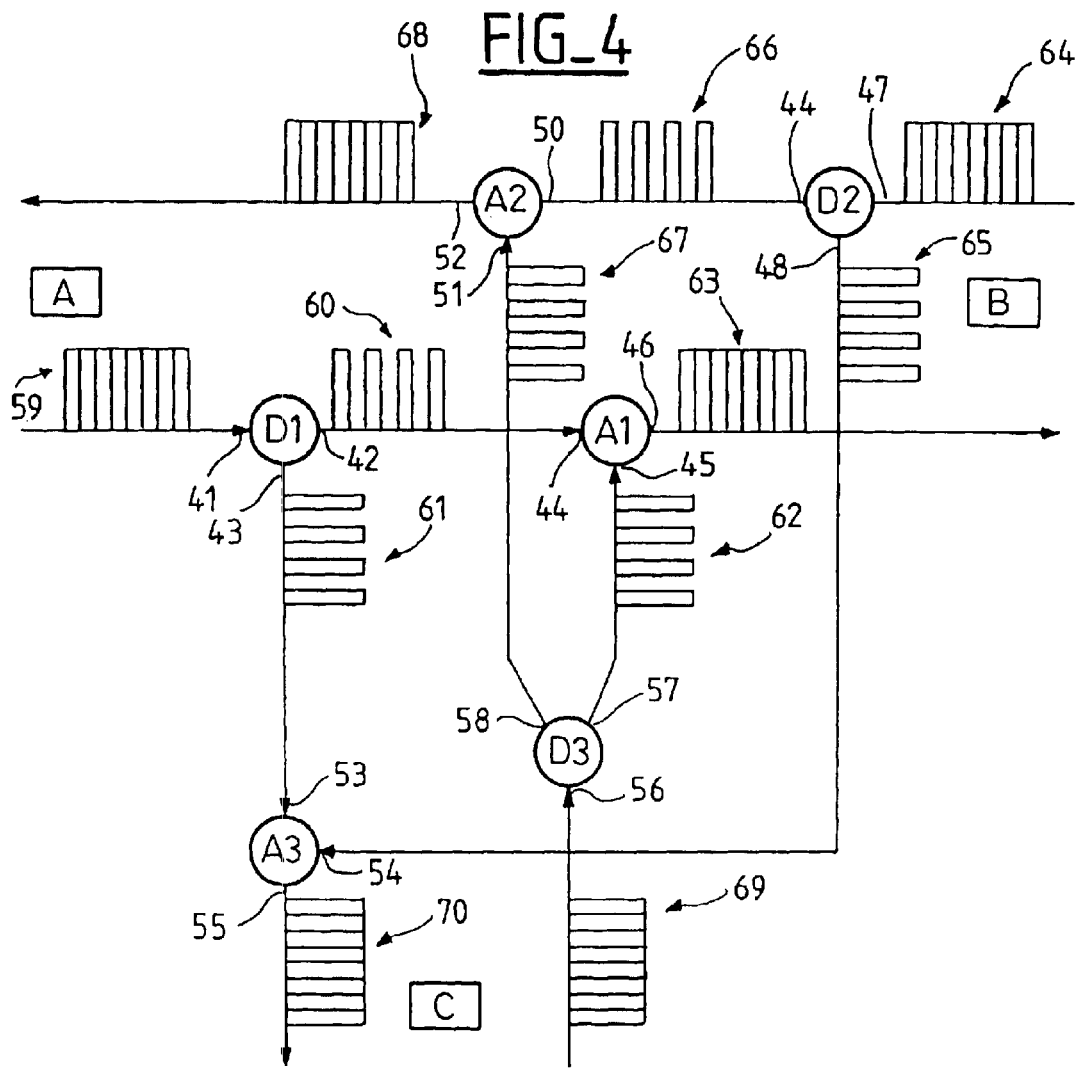
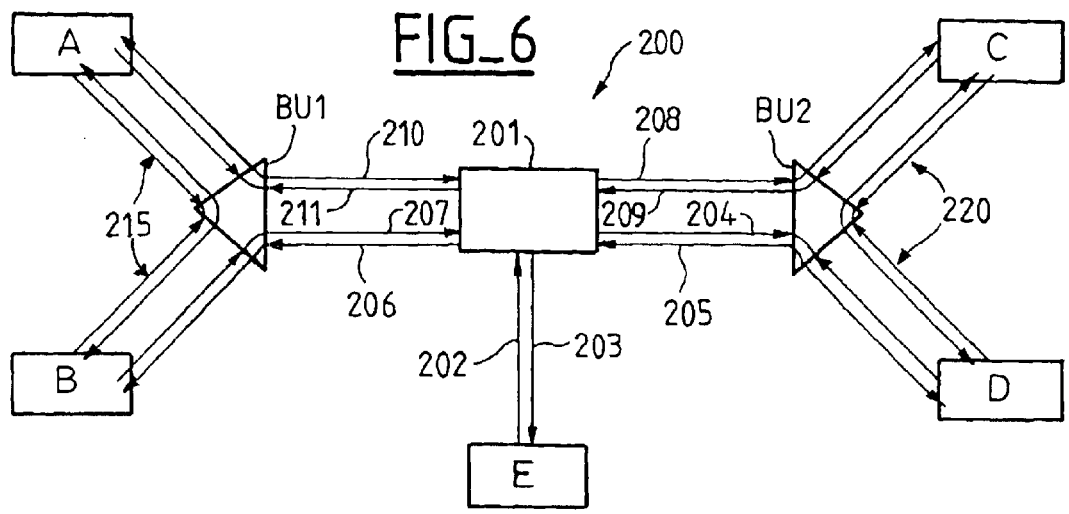

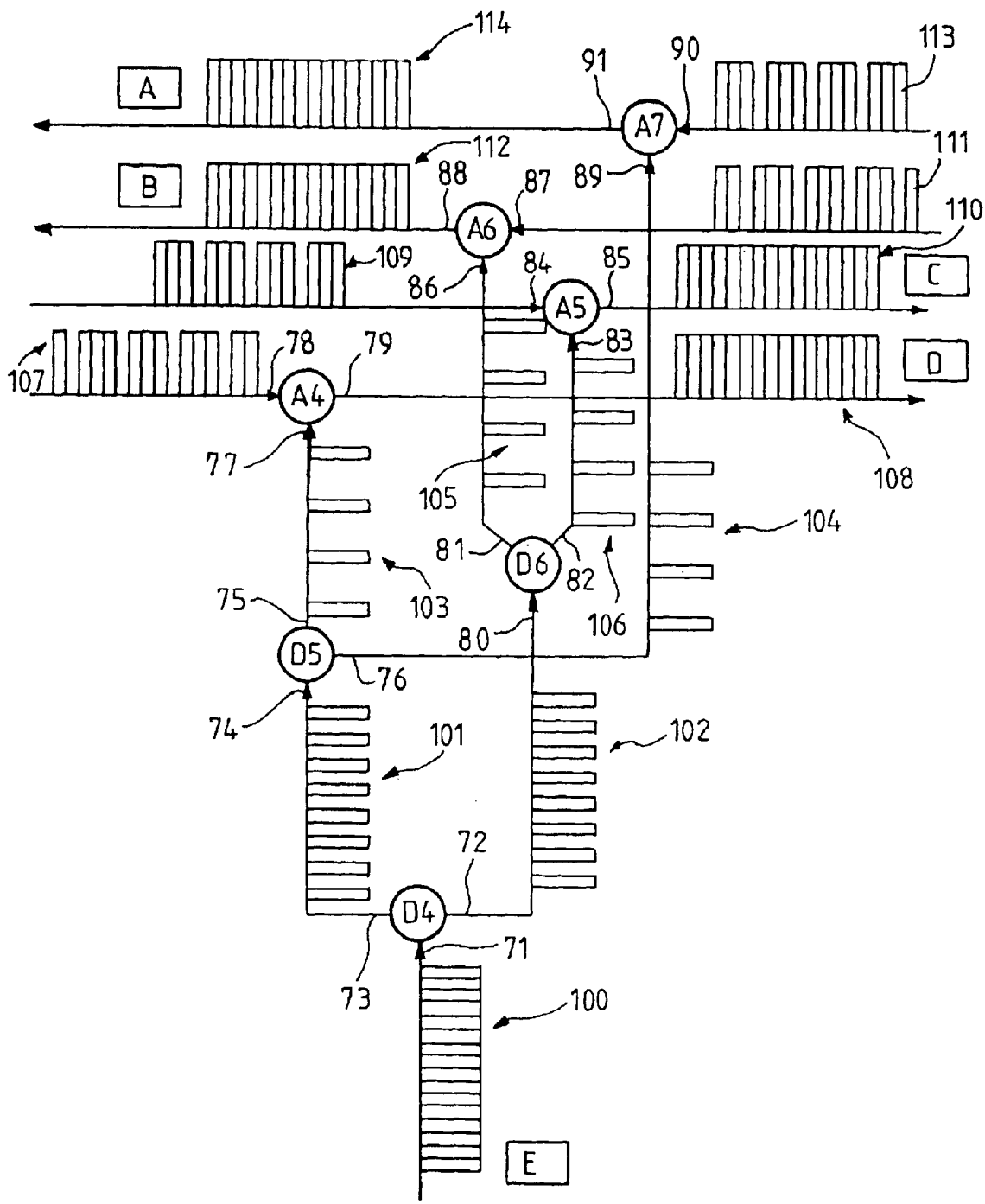
FIG_5

BRANCHING UNIT

The present invention relates to an optical branching unit for optical transmission systems.

BACKGROUND OF THE INVENTION

Modern optical communications systems typically use many separate but interconnected optical transmission lines. These optical transmission lines are typically interconnected using branching units which allow selected optical signals to be removed from any one optical transmission line and inserted in to another connected optical transmission line.

Current optical branching units typically employ optical components which permit selected portions of optical signals to be removed from a transmission line and inserted in to another transmission line on the basis of wavelength. This form of branching unit is particularly suited to use with wavelength division multiplex (WDM) signals comprising a plurality of distinct but closely spaced wavelength channels. The branching unit may be configured to drop and add specific WDM wavelength channels from a particular transmission line.

FIG. 1 illustrates an example of such an arrangement. The branching unit generally denoted 1 comprises a first circulator 2 a second circulator 3 and an intermediate reflective grating 4 placed in between the two circulators. The first circulator 2 has one optical input 5 and two optical outputs 6 and 7, while the second circulator 3 has two optical inputs 8 and 9, and one optical output 10. One optical output 7 of the first circulator 2 is in optical connection with one optical input 8 of the second circulator 3.

In use, when a WDM optical signal 11 is input to optical input 5 of the branching unit, the entire signal is output at optical output 7 of the first circulator 2. Selected wavelength channels, such as channel 12, are subsequently reflected by the reflective grating 4 and redirected in to the circulator 2 for output at optical output 6. Thus one selected wavelength channel may be dropped from the input signal 11 by appropriately choosing the wavelength reflectivity of the reflective grating 4.

The remaining components 13 of the optical signal 11 then pass to an optical input 8 of the second circulator 3, and are combined with an optical channel 12 which is input at the other optical input 9 of the second circulator 3. The channel 12 is reflected by the reflective grating 4, in a manner similar to the reflection of the corresponding channel 12 output from the optical output 7 of the first circulator 2. The combined optical signal 15 is then output at the optical output 10 of the second circulator 3. Thus, a single optical channel 12 may be dropped from, and added to, optical signal 11.

Additional optical channels may be dropped from optical input signal 11 by employing additional reflective grating elements placed in line with grating element 4 which each have a pre-selected reflectivity appropriate to the channel to be reflected thereby. Clearly, a disadvantage of such an arrangement lies in the fact that in order to be reflected by a given one reflective grating, each pre-selected channel must traverse at least one such grating two times.

The first traversal occurring as the optical channel approaches the grating, the second traversal occurring after reflection thereby. Each such traversal incurs loss in the respective channel, and therefore the greater number of traversals required, the greater the loss incurred. If a larger number of wavelength channels are required to be dropped, a correspondingly large number of gratings will be required. In such circumstances the losses may be high and often produce a large "loss tilt" whereby the channel reflected in the last grating suffers a much higher loss than the channel reflected in the first grating. Channels reflected by intermediate gratings suffer a loss intermediate these two extremes and the result is a strong drop-off, or "tilt", in the intensities of successive channels.

It will be noted that in the branching unit illustrated in FIG. 1, the wavelength channel 12 that is dropped from the incoming signal 11 is the same wavelength channel that is subsequently added by the second circulator of the branching unit to provide output signal 15. This is necessary in order to avoid optical hole burning in the optical signal output by the branching unit as would occur where the hole 16 in the intermediate signal 13 of the branching unit not filled by the optical channel 12 added thereto by the second circulator 3 of the branching unit. Clearly, this seriously reduces the network routing capacity of any network employing branching units of this type since any channels removed from an optical transmission line by the branching unit must be subsequently added to the transmission line by the same branching unit.

Additionally, wavelength dependant add and drop branching units based on reflective gratings are generally difficult to manufacture, and are limited in the number of channels they may add and drop. Indeed, due to problems associated with chromatic dispersion in the reflective grating implied in such branching units, data transmission rates are limited to 2.5 gigabits per second through such branching units.

SUMMARY OF THE INVENTION

Thus, there is a recognised need for optical branching units which do not suffer from the limitations inherent in branching units based on reflection gratings. The present invention aims to provide a branching unit which overcomes at least some of these deficiencies in the prior art.

At its most general the present invention proposes to employ a plurality of interconnected optical interleavers in a branching unit for the purposes of separating at least some optical signals input thereto into separate component signals for output on separate branches, and for combining separated component optical signals with other input optical signals for output on common branches of the branching unit.

An interleaver is an optical device having three optical transmission ports in which, the transmission characteristic between a first and a second of the optical ports has the form of a first series of spaced wavelength channels, and the transmission characteristic between the first and a third of the optical ports has the form of a second series of spaced wavelength channels, wherein the wavelength positions of the first series interleaves the wavelength positions of the second series and all the transmission characteristics impart substantially equal (or at least to within a small margin of difference e.g. about 1 dB or less over the channels employed) insertion loss upon all the channels transmitted through the interleaver within its transmission characteristics.

The use of interleavers obviates the need to use wavelength selective fibre gratings in an optical transmission line in order to redirect components of optical signals (such as DWDM optical channels) input to the branching unit, and thereby avoids the aforementioned disadvantages associated with their use, particularly the high loss tilt due to rapidly increasing loss across channels. Thus, interleavers substantially mitigate insertion loss tilt across channels.

Furthermore, it has been found that optical interleavers provide a thermally stable branching apparatus having low insertion loss. This typically makes the design and manufacture of network nodes employing such branching apparatus easier than when branching units employing reflective gratings are used.

The present invention may provide a branching unit having a first optical input for receiving optical signals, a second optical input for receiving optical signals, branching apparatus comprising a plurality of interconnected interleavers for separating component portions of optical signals input at the first optical input and for combining some of those separated optical signal component portions with other optical signals input at the second optical input so as to provide combined optical signals, a first optical output for outputting the combined optical signals, and a second optical output for outputting other of the separated optical signal component portions.

Thus, a branching unit may be provided in which the adding and dropping of signal components (e.g. DWDM channels) is performed by interconnected interleavers.

The plurality of interconnected interleavers of the branching apparatus may be configured to separate component portions of optical signals input at the second optical input of the branching unit, and to combine some of those separated component portions with separated component portions of optical signals input at the first optical input so as to provide the aforementioned combined optical signals. The branching unit preferably has a third optical output for outputting other of the separated component portions of optical signals input at the second optical input of the branching unit.

Thus, some of the separated portions of optical signals input at the first optical input of the branching unit may be combined with some of the separated portions of optical signals input at the second optical input, then output at the first optical output. The other separated portions of either of the input signals are then output at other outputs of the branching unit.

The branching unit may have a third optical input for receiving optical signals, and the branching apparatus may be configured to combine the other of the separated component portions of optical signals input at the second optical input with optical signals input at the third optical input so as to provide combined optical signals for output at the third optical output of the branching unit. Thus, a combined optical signal may be provided at several optical outputs (i.e. branches) of the branching unit simultaneously, the optical signal at each being derived in part from the same one input signal. It will be appreciated that this feature of the present invention enhances the interconnectivity and versatility of the branches of the present branching unit.

The branching apparatus is preferably configured to separate component portions of the optical signals input at the third optical input of the branching unit, to combine some of those separated component portions with the other of the separated component portions of optical signals input at the second optical input so as to provide the aforementioned combined optical signals for output at the third optical output of the branching unit, and to output at the second optical output of the branching unit other of the separated component portions of optical signals input at the third optical input of the branching unit.

Thus, the branching unit may provide at a given branch a combined optical output comprising parts of optical signals input at the first and second optical inputs, and at another branch a combined optical output comprising parts of optical signals input at the second and third optical inputs.

The branching apparatus of the branching unit may be configured to combine the other of the separated component portions of optical signals input at the third optical input of the branching unit with the aforementioned other of the separated component portions of optical signals input at the first optical input of the branching unit so as to provide combined optical signals for output at the second optical output of the branching unit. Thus, the branching unit may provide at a first branch a combined optical output comprising parts of optical signals input at the first and second optical inputs, at a second branch a combined optical output comprising parts of optical signals input at the second and third optical inputs, and at a third branch a combined optical output comprising parts of optical signals input at the first and third optical inputs.

Preferably, the branching apparatus comprises at least one concatenated group of interleavers comprising, an initial drop interleaver having one optical input for receiving optical signals and two separate optical outputs each for outputting respective component portions of optical signals received thereby, and a terminal add interleaver having two separate optical inputs each for receiving optical signals and one optical output for outputting a combination of optical signals concurrently received at the two inputs thereof, wherein one optical output of the initial drop interleaver is in optical connection with one optical input of the terminal add interleaver of the concatenated group.

Depending upon the function of the branching apparatus, there may be one or more intermediate concatenated interleavers connected between the initial drop interleaver and the terminal add interleaver of each concatenated group. Each such intermediate interleaver preferably has one optical input port connected to a neighbouring interleaver of the group, one optical output port connected to another neighbouring interleaver of the group, and a third optical port (which may be an input port or an output port) connected to interleavers not in the group (e.g. interleavers of other concatenated groups).

If the function of a concatenated group is to separate optical signals input at the initial drop interleaver into a multiplicity of component portions and to add one such component portion to other optical signals input to the terminal add interleaver of the group, then the intermediate interleavers are preferably all drop interleavers. Thus, a concatenated group of this configuration has the overall function of dropping component signals input thereto.

However, if the function of a concatenated group of interleavers is to combine a multiplicity of separate component portions of optical signals separately input at the initial drop interleaver and each intermediate interleaver, and to combine those component portions with other signals input at the add interleaver, then the intermediate interleavers are preferably all add interleavers. Thus, a concatenated group of this configuration has the overall function of adding (combining) component signals input thereto.

The branching apparatus preferably comprises a number of concatenated groups of interleavers, one or more of which groups have an add function and one or more have a drop function. Preferably, in the branching apparatus, the number of concatenated interleaver groups having an add function is equal to the number of concatenated interleaver groups having a drop function. This enables full connectivity between each optical input and each optical output of the branching unit.

The group of interleavers may comprise only one drop interleaver such that an optical output of that interleaver is in direct optical connection to the terminal add interleaver. However, a plurality of drop interleavers may be employed within the group, an optical output of all but the penultimate drop interleaver being connected indirectly via one or more intermediate drop interleavers each forming part of the group of interleavers.

Thus, each of the first to the penultimate drop interleavers of the group of concatenated interleavers may serve to "drop" one of two component portions of optical signals input thereto, and the terminal add interleaver may serve to add to the un-dropped optical signal portion input thereto by the penultimate interleaver optical signals input at the other optical input of the terminal add interleaver.

It will be appreciated that an add-drop capability is provided by just one concatenated pair of interleavers comprising one drop interleaver and one add interleaver, and the branching apparatus of the branching unit may comprise a single such pair of concatenated interleavers. Preferably, the branching apparatus comprises a plurality of such concatenated pairs.

For example, the branching apparatus may comprise six interconnected interleavers defining six distinct concatenated pairs of interleavers wherein the one optical input of the first interleaver of each pair is arranged to receive optical signals input at one of the optical inputs of the branching unit and the one optical output of the second interleaver of each pair is arranged to output optical signals to one of the optical outputs of the branching unit. The second of the two optical outputs of the first interleaver of each concatenated pair is connected to the second of the two optical inputs of the second interleaver of another concatenated pair. In this way, full interconnectivity is achieved between the three optical inputs and the three optical outputs of the branching unit.

The present invention may provide a network routing unit comprising one or more aforementioned branching units for use in an optical communications network, and may provide an optical telecommunications network comprising one or more such branching units or network routing units. The network routing unit may be a submerged or submarine network routing unit, and the optical telecommunications unit may be a submerged or submarine optical telecommunications network.

BRIEF DESCRIPTION OF THE DRAWINGS

There now follows a non-limiting example of the present invention, reference being made to the following drawings:

FIG. 1 illustrates a prior art wavelength dependant branching unit based on reflection gratings;

FIG. 2 illustrates the functionality of an interleaver;

FIG. 3 illustrates a concatenated pair of interleavers;

FIG. 4 illustrates a branching unit comprising six distinct pairs of concatenated interleavers;

FIG. 5 illustrates four distinct groups of three concatenated interleavers configured to add one input optical signal to four separate optical transmission lines;

FIG. 6 illustrates an optical network employing two optical branching units.

DETAILED DESCRIPTION OF THE INVENTION

Referring to FIG. 2 there is illustrated an interleaver 17 possessing a first optical port 18, a second optical port 19, and a third optical port 20. Dense wavelength division multiplexed (DWDM) optical channels are illustrated as being input at the first and second optical input ports, 18 and 19, of the interleaver. Each of these optical inputs consists of a string of spaced optical wavelength channels at distinct optical wavelengths. The action of the interleaver is to interleave the string of optical channels input at the first optical port 18 of the interleaver with the second string of optical channels input at the second optical input 19 of the interleaver and to output the result as a combined optical signal at the third optical port 20 of the interleaver. The combined optical signal 23 therefore consists of the first string 21 of optical signals interleaved with the second string 22 of optical signals.

The operation of the interleaver 17 is also reversible, in that were the combined signal 23 to be input to the third optical port 20 of the interleaver, the outputs of the interleaver at ports 18 and 19 would consist of the separated strings 21 and 22, respectively, as illustrated in FIG. 2. Thus, any two separate strings of optical channels concurrently input at the first two optical ports of the interleaver will be combined thereby in to a composite signal which is output on the third of the optical ports of the interleaver. The interleaver therefore acts as an add interleaver. The interleaver may function in reverse whereby one optical signal input at the third optical port of the interleaver is separated thereby in to two component optical signals for separate output at the first and second optical ports thereof.

The interleaver therefore acts as a drop interleaver in this circumstance.

FIG. 3 illustrates a pair of concatenated interleavers providing a basic add and drop capability. The pair consists of first drop interleaver D connected to a second add interleaver A. The first interleaver D comprises a first input port 24, a first output port 26 and a second output port 25. The first output port of drop interleaver D is connected to a first input port 27 of the add interleaver A which itself has a second optical input port 28 and the first optical output port 29. Thus, composite optical signals 30 input at the optical input port 24 of drop interleaver D are separated thereby in to component portions, a first of which is output on the first optical output port 26 and directed to the input port 27 of add interleaver A. The second component portion 32 of the optical signal 30 input to the drop interleaver D, is dropped from the pair of concatenated interleavers via the optical output port 25.

Optical signals merely concurrently input to the second input port 28 of the add interleaver A for combination with optical signals 31 input at the first input port 27 thereof which emanate from the drop interleaver D. The add interleaver A serves to interleave these two optical signals and produce a combined optical signal 34 for output at its optical output port 29.

In use, the optical signals input at the second input port 28 of the add interleaver A consist of a string of DWDM optical channels positioned at the same wavelengths as those of the channels 32 dropped by the drop interleaver D. This enables signal channels input to the add interleaver A to replace those dropped by the drop interleaver D. Thus, a basic add and drop capability may be provided by connecting one drop interleaver to one add interleaver as illustrated in FIG. 3.

FIG. 4 illustrates a branching apparatus for a branching unit having three branches A, B and C. The branching apparatus consists of six interconnected interleavers three of which are add interleavers and three of which are drop interleavers. The six interleavers are interconnected so as to form six distinct pairs of concatenated interleavers configured in the manner illustrated in FIG. 3. Each pair of concatenated interleavers comprises a first interleaver being a drop interleaver, and a second interleaver being an add interleaver. Each of the branches A, B and C of the branching unit have one optical input and one optical output each of which is connected to a respective optical input or output of a separate interleaver pair.

The six distinct pairs of interleavers are the drop interleaver D1 with the add interleaver A1, the drop interleaver D2 with the add interleaver A2, the drop interleaver D1 with the add interleaver A3, the drop interleaver D3 with the add interleaver A1, the drop interleaver D3 with the add interleaver A2, and the drop interleaver D2 with the add interleaver A3.

This pairing permits optical signals input at any one branch of the three branches A, B and C of the branching unit, to be separated in to two component portions which are then each separately combined with separated component portions of optical signals input at the other two optical inputs of the branching unit for subsequent output on a respective one output of the other two branches.

FIG. 4 illustrates this process in operation in terms of a first optical signal 59 input at the optical input of branch A concurrently with a similar optical signal 64 input at branch B and a third similar optical signal 69 input at the optical input of branch C of the branching unit.

Each one of these three signals consists of a string of DWDM optical channels, the string comprising even-numbered channels interleaved with odd-numbered channels. The optical signal 59 input at branch A of the branching unit is directed to the optical input 41 of drop interleaver D1 of the first and third interleaver pair. The drop interleaver D1 separates the input optical signal 59 in to the first portion comprising all of the even-numbered DWDM channels of the optical signal, and a second portion comprising all of the odd-numbered channels thereof. The first portion is output at the first optical output of the interleaver D1 for input to the first optical input port 44 of the add interleaver A1 of the first interleaver pair.

Concurrently, the second portion 61 of the input optical signal 59 is output at the output port 43 of drop interleaver D1 for input to the first optical input port 53 of the add interleaver A3 of the third interleaver pair.

In a similar manner, the optical signal 64 input at the optical input of branch B of the branching unit is directed to the optical input port 47 of the drop interleaver D2 of the second and sixth interleaver pair.

This drop interleaver similarly separates the input optical signal 64 in to its component even-numbered and odd-numbered DWDM signals portions.

The even-numbered channels 65 being output at the first optical output port 48 of this drop interleaver for input at the second optical input port of the add interleaver A3 of the sixth and third pairs of concatenated interleavers so as to be combined thereby with the separate group of even channels 61 input at the first input port 53 of add interleaver A3 so as to provide a combined optical signal 70 the output port 55 thereof. This combined signal is subsequently output on the output port of branch C of the branching unit.

An optical signal 69 comprising interleaved even-numbered and odd-numbered DWDM channels input at branch C is directed to the input port 56 of drop interleaver D3 of the fourth and fifth interleaver pairs, the odd-numbered channels 62 being output at the first output port 57 thereof to the second input port 45 of add interleaver A1 of the fourth interleaver pair. Simultaneously, the even numbered channels 67 of the optical signal are output at the second output port 58 of drop interleaver D3 and are directed to the second optical input port 51 of add interleaver A2 of the second and the fifth interleaver pairs. Thus, odd numbered channels 62 input to interleaver A1 are combined thereby with even numbered channels 60 concurrently input thereto so as to provide a combined optical output signal at output port 46 thereof comprising interleaved even and odd such signals. This combined signal is then directed to the optical output port of branch B of the branching unit.

Similarly, even numbered channels 67 input to add interleaver A2 concurrently with odd numbered channels 66 input thereto from drop interleaver D2 are interleaved by add interleaver A2 so as to provide the combined optical signal 68 at the optical output 52 thereof. This combined optical signal is subsequently directed to the optical output of branch A of the branching unit.

Thus, it will be appreciated that any DWDM optical signal input at a given one of the three branches of the branching unit will be separated in to its even-numbered and odd-numbered DWDM channel portions which portions will be subsequently output on different ones of the other two output ports of the branching unit in combination with odd-numbered and even-numbered channel portions of DWDM optical signals respectively input at the other two optical input ports of the branching unit. Thus, full DWDM fibre inconnectivity is achieved in this way.

FIG. 5 illustrates branching apparatus of a branching unit comprising four distict groups of three concatenated interleavers. Each one of these interleaver triplets connects the optical input E of the branching unit with one of four optical output ports A, B, C, and D of the branching unit. Each interleaver triplet comprises an initial drop interleaver connected to an intermediate drop interleaver and terminating with a terminal add interleaver.

The four distinct interleavers triplets illustrated in FIG. 5 include: a first interleaver triplet comprising initial drop interleaver D4 in combination with intermediate drop interleaver D5 and terminating with terminal add interleaver A4; a second triplet comprising an initial drop interleaver D4 combined with an intermediate drop interleaver D6 and terminating with terminal add interleaver A6; a third triplet comprising initial drop interleaver D4 in combination with intermediate drop interleaver D6 and terminating with terminal add interleaver A5; and finally, a fourth triplet comprising initial drop interleaver D4 in combination with intermediate drop interleaver D5 and terminating with terminal add interleaver A7.

It will be appreciated that in any one such interleaver triplet, one optical output of the initial interleaver thereof is connected to the optical input port of the intermediate drop interleaver, and one optical output port of the intermediate drop interleaver is subsequently connected to one optical input port of the terminal add interleaver of the triplet.

First, a DWDM optical signal 100 input at the optical input port 71 of the initial drop interleaver D4 of each of the four interleaver triplets is separated thereby in to component even-numbered and odd-numbered DWDM optical channels. The odd-numbered channels 101 are output at a first optical output port 73 of the drop interleaver D4 while the even-numbered channels 102 are output at the second optical output port 72 thereof. The odd-numbered optical channels 101 are subsequently directed to the optical input port of intermediate drop interleaver D5 of both the first and the fourth interleaver triplet, while the even-numbered channels 102 are directed to the optical input port 80 of the intermediate drop interleaver D6 of the second and the third interleaver triplets.

The intermediate drop interleaver D5 separates the optical channels input thereto in to even-numbered and odd-numbered channels outputting the odd-numbered channels on the first optical output port 76 thereof whilst simultaneously outputting the even-numbered channels on the second optical output port 75 thereof. Similarly, the intermediate drop interleaver D6 separates the optical signal 102 input thereto in to odd-numbered channels for output at a first optical output port 82 thereof, and even-numbered channels for output at optical output port 81 thereof. Even-numbered channels output by the intermediate drop interleaver D5 of the first interleaver triplet are directed to one optical input port 77 of the terminal add interleaver A4 of that triplet for combination with optical signals 107 concurrently input to the second optical input port 78 thereof. These combined signals are subsequently output at the optical output port 79 so as to provide combined signal 108 which is subsequently directed to the optical output port of branch D of the branching apparatus.

Similarly, odd-numbered channels output by intermediate drop interleaver D5 at output port 76 thereof are directed to an optical input port 89 of the terminal add interleaver A7 of the fourth interleaver triplet.

Optical signals 113 concurrently input to the second optical input port 90 of terminal add interleaver A7 are combined thereby with the odd-numbered channels input thereto at the first optical input port 89 so as to provide at the optical output port 91 thereof a combined optical signal 114 for output at the optical output port A of the branching apparatus.

In a similar manner, even-numbered and odd-numbered optical channels input to terminal add interleavers A6 and A5 of the second and the third interleaver triplets respectively, are combined with other optical signals input to those respective terminal add interleavers so as to provide combined optical signals for output at the optical output port B and C of the branching apparatus.

Thus it will be appreciated that in interconnecting the four distinct interleaver triplets in this way a cascaded array of interleavers is provided which enables optical signals input at input branch E of the branching apparatus to be separated in to four distinct optical signal portions each of which may be subsequently combined with separate optical signals and output on one of four separate optical outputs of the branching apparatus.

It will be readily appreciated that the operation of the branching apparatus illustrated in FIG. 5 may be reversed simply by reversing the operation of each interleaver in that apparatus. That is to say, by replacing each terminal add interleaver A4, A5, A6 and A7, with a drop interleaver and similarly replacing each of the drop interleavers D4, D5 and D6 with an add interleaver, the function of each one of the four distinct interleaver triplets may be reversed.

In such a situation, optical signals may be directed in to the optical input of each initial drop interleaver of the four modified interleaver triplets from a respective one of the optical ports A, B, C or D of the branching apparatus. The intermediate and terminal add interleavers would then serve to combine the optical signals separately dropped by each of the four initial drop interleavers so as to provide a combined optical signal consisting of those four dropped portions for output at the optical port E of the modified branching apparatus.

By combining such a modified branching apparatus with the branching apparatus illustrated in FIG. 5, there is provided a branching unit having full interconnectivity between branch E and each of the other four branches A, B, C and D, of the branching unit.

FIG. 6 illustrates an optical network using just such an optical branching unit. The optical network 200 comprises a submerged network node 201 within which is located the branching unit, the network node interconnecting terminal E with each one of four other terminal nodes A, B, C and D. Optical interconnection from terminal E to each one of the other four optical terminals is achieved via optical transmission line 202 which passes from terminal E to an optical input port of the branching unit located within the submerged network node 201, and via respective ones of the four optical output transmission lines 211, 206, 208 and 204 to respective terminals A, B, C and D. Optical branching apparatus of the form and configuration illustrated in FIG. 5 achieves this interconnectivity and allows optical signals output from terminal E to be separated in to four distinct portions each one of which is directed to a respective one of the other four connected terminals.

The submerged network node 201 also includes modified optical branching apparatus as discussed above which permits optical signals input to the network node from terminals A, B, C or D, via optical transmission lines 210, 207, 209 and 205, to be combined by the modified branching apparatus as discussed above and output to the terminal E along optical transmission line 203.

In this way, a branching unit comprising branching apparatus as discussed with reference to FIG. 5 may be used to interconnect terminal E with four other terminals each located in a different physical location. The optical network 200 also includes two full add and drop branching units BU1 and BU2, which permit direct add and drop interconnectivity between terminals A and B, and between terminals C and D respectively, by way of respective add and drop optical transmission line-pairs 215 and 220.

Thus, it will be appreciated that the present invention may provide a branching unit which permits optical interconnectivity between branches thereof by way of a branching apparatus comprising a plurality of interconnected interleavers. It will be readily appreciated that pluralities of interleavers may be interconnected in ways other than illustrated and described in the present embodiments, without departing from the scope of the present invention.

What is claimed is:

1. A branching unit A branching unit comprising:

a first optical input for receiving optical signals, a second optical input for receiving optical signals, branching apparatus comprising a plurality of interconnected interleavers for separating component portions of optical signals input at the first optical input and for combining some of those separated optical signal component portions with other optical signals input at the second optical input so as to provide combined optical signals, a first optical output for outputting the combined optical signals, and a second optical output for outputting other of the separated optical signal component portions, wherein the branching apparatus further comprises at least one concatenated group of interleavers comprising: an initial drop interleaver having one optical input for receiving optical signals and two separate optical outputs each for outputting respective component portions of optical signals received thereby; and a terminal add interleaver having two separate optical inputs each for receiving optical signals and one optical output for outputting a combination of optical signals concurrently received at the two inputs thereof, wherein one optical output of the initial drop interleaver is in optical connection with one optical input of the terminal add interleaver of the concatenated group.

2. A branching unit according to claim 1 wherein the branching apparatus comprises one or more intermediate concatenated interleavers connected between the initial drop interleaver and the terminal add interleaver of each concatenated group.

3. A branching unit according to claim 2 wherein each said intermediate interleaver has one optical input port connected to a neighbouring interleaver of the group, one optical output port connected to another neighbouring interleaver of the group, and a third optical port connected to interleavers not in the concatenated group.

4. A branching unit according to claim 3 wherein said third optical port of each said intermediate interleaver is an optical input port.

5. A branching unit according to claim 4 wherein said third optical port is connected to interleavers of other concatenated groups of interleavers of the branching apparatus.

6. A branching unit according to claim 5 wherein at least one of the groups of concatenated interleavers is a drop group in which all of the intermediate interleavers are drop interleavers, and the at least one drop group is configured to separate optical signals input at the initial drop interleaver thereof into a multiplicity of component portions and to add one such component portion to other optical signals input to the terminal add interleaver of the drop group.

7. A branching unit comprising at least one drop group according to claim 6 and at least one add group in which all of the intermediate interleavers are add interleavers, and the at least one add group is configured to combine a multiplicity of separate component portions of optical signals separately input at the initial drop interleaver and each intermediate interleaver of the add group, and to combine those component portions with other signals input at the add interleaver of the add group.

8. A branching unit according to claim 7 wherein in the number of add groups in the branching apparatus is equal to the number of drop groups therein.

9. A branching unit according to claim 3 wherein said third optical port of each said intermediate interleaver is an optical output port.

10. A branching unit according to claim 5 wherein at least one of the groups of concatenated interleavers is an add group in which all of the intermediate interleavers are add interleavers, and the at least one add group is configured to combine a multiplicity of separate component portions of optical signals separately input at the initial drop interleaver and each intermediate interleaver of the add group, and to combine those component portions with other signals input at the add interleaver of the add group.

11. A branching unit according to claim 1 wherein each group of concatenated interleavers comprises a pair of interleavers, each pair having only one drop interleaver such that an optical output of that interleaver is in direct optical connection to the terminal add interleaver.

12. A branching unit according to claim 11 wherein the branching apparatus comprises a plurality of such concatenated pairs.

13. A branching unit according to claim 12 wherein the branching apparatus comprises six interconnected interleavers defining six distinct pairs of concatenated interleavers wherein the one optical input of the first interleaver of each pair is arranged to receive optical signals input at one of the optical inputs of the branching unit and the one optical output of the second interleaver of each pair is arranged to output optical signals to one of the optical outputs of the branching unit.

14. A branching unit according to claim 13 wherein the second of the two optical outputs of the first interleaver of each concatenated pair is connected to the second of the two optical inputs of the second interleaver of another concatenated pair.

15. A branching unit according to claim 1 wherein the branching apparatus is operable to receive optical signals comprising a plurality of wavelength division multiplexed optical channels, to separate such received optical signals into component portions comprising at least one said optical channel, to combine at least some of those separated component portions with other such separated portions, and to output the combined signals.

16. An optical network routing unit comprising one or more branching units according to claim 1.

17. An optical telecommunications network comprising one or more network routing units according to claim 16.

18. A submarine optical network routing unit comprising one or more network routing units according to claim 16.

* * * * *